Oct. 2, 1962 M. W. HORRELL 3,056,550
VARIABLE-EXPONENT COMPUTERS
Filed Jan. 18, 1960
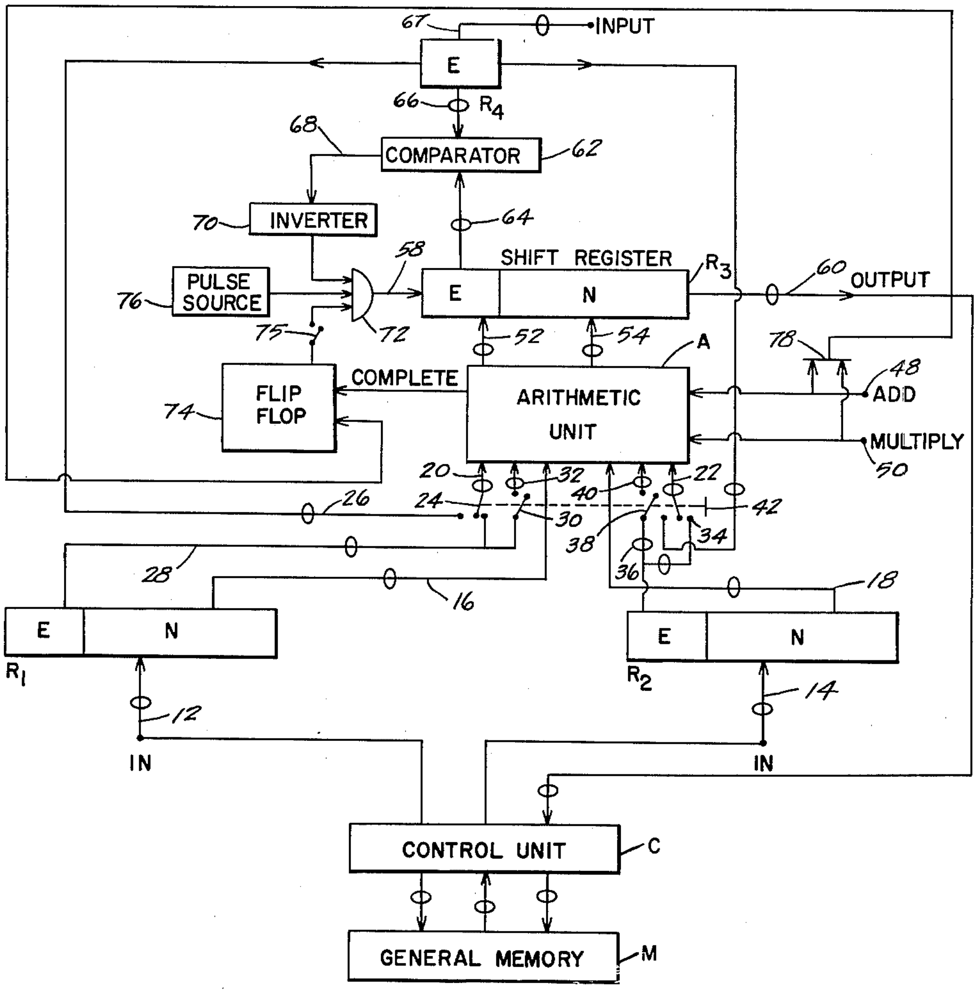
MAURICE W. HORRELL
*INVENTOR.*
BY Byard G. Nilsson United States Patent Office 3,056,550

Patented Oct. 2, 1962

3,056,550
VARIABLE-EXPONENT COMPUTERS

Maurice W. Horrell, Playa Del Rey, Calif., assignor to The Bendix Corporation, a corporation of Delaware Filed Jan. 18, 1960, Ser. No. 2,967
8 Claims. (Cl. 235—164)

The present invention relates to a computing system in which numbers may be registered in the form of separate groups of digits along with a single common variable value to indicate the location of the point in each group of digits.

Previous computing machines have employed various forms of representation for numerical values, one of which is termed "floating-point." According to this form of representation, numbers are represented by two groups of signals, one of which indicates a series of digits (mantissa), while the other locates the point in the digits (characteristic). For example, the decimal number 56.81 ($.5681\times10^2$) could be represented in floating-point notation as 5681 02. The value 5681 (mantissa) is assumed to have the decimal point at the left of the most-significant digit, 5. This arbitrary decimal-point location is indicated to be shifted two digits to the right by the characteristic 02 which is an exponent of the radix employed, i.e. ten. Thus the representation 5681 02 in floating-point notation is 56.81.

Floating-point notation is very useful in dealing with numbers of widely-varying magnitude, as the registration of large numbers of "Zeros" (to establish the location of the point) is avoided.

According to prior practice, computers using floating-point notation have registered numbers in the form of memory words including one part to represent the mantissa and another part to represent the characteristic. However, in some instances this memory-word format is not economical of storage space. For example, in the solution of certain problems, e.g. business problems, many numbers may be of the same order of magnitude, so that the characteristic values in several memory words are identical. In such situations, considerable storage space (which could be otherwise used) serves to repeatedly register the same characteristic value in many memory words. Therefore, a need exists for a computer system having the flexibility to variously employ storage capacity and thereby obtain storage economy according to the type of data in process.

In general, the present invention comprises a computing system incorporating a memory, an arithmetic unit and a control means for effecting the orderly movement and combination of date-representing signals. The system further includes a characteristic register which may be employed to store characteristic values that indicate the point location in numbers represented. The value registered in the characteristic register may be changed, as data is processed, to thereby obtain considerable flexibility and permit good utilization of the memory. The system may be employed in conjunction with floating-point structure, to provide for either conventional floating-point operation or variable-exponent operation as described hereafter.

An object of the present invention is to provide an improved computer which enables greater flexibility in registering data, to thereby accomplish more economical use of storage capacity.

Another object of the present invention is to provide a system capable of operating either in conventional floating-point mode, or in a variable-exponent mode to thereby best utilize storage capacity depending upon the type of data in process.

These and other objects and advantages of the present invention will become apparent from a consideration of the following specification and appended drawing, wherein the single FIGURE is a diagrammatic representation of a system constructed in accordance with the present invention.

A pair of registers R1 and R2 are shown (near the bottom of the figure) which are connected to a control unit C that is in turn connected to a general memory M. The registers R1 and R2 may comprise various digital registers, depending upon the type computer in which the invention is embodied, e.g. serial, parallel, high speed, etc. The registers R1 and R2 receive selected digital signals from the memory M under control of the control unit C. The registers R1 and R2 are also connected (as will be described hereinafter) to an arithmetic unit A, which arithmetically combines signal-represented values from the registers to produce result signals.

In considering the system generally, during one mode-of-operation, the registers R1 and R2 contain values in conventional floating-point form, and the arithmetic unit A operates to produce floating-point signals (representative of an arithmetic combination of the values of registers R1 and R2) in a register R3. In an alternate mode-of-operation, termed variable exponent operation, the registers R1 and R2 are both fully utilized to register a mantissa value, and a characteristic register R4 (top of figure) holds a characteristic value to establish the location of the point in both mantissa values contained in registers R1 and R2. In this mode-of-operation, the space in the registers R1 and R2 (which is otherwise employed to register, the characteristic) is utilized to extend the digit capacity of the mantissa and various fixed exponents or characteristics are common to both values.

Considering the illustrative system in greater detail, the registers R1 and R2 are connected to receive parallel signals (indicative of numbers) through cables 12 and 14 respectively from the memory M. These signals may be in binary form, binary-coded decimal form or various other formats. The output signals from the arithmetic unit A developed in the register R3 are transferred to the memory M through the control unit C. Various arrangements of control and general memory are well-known in the art and need not be described herein. For example, control of a dynamic memory may be as disclosed in United States Patent 2,611,813, Sharpless et al. or control of a static memory may be as shown and described in United States Patent 2,691,156, Saltz et al. The disclosed structure of either system may be employed as applicant's general memory M and control unit C.

The registers R1 and R2 include an "N" section for registering a mantissa and an "E" section for registering either a characteristic or additional digits of the mantissa, depending upon the mode-of-operation and the words from the general memory. The "N" sections of the registers R1 and R2 are connected to the arithmetic unit A by cables 16 and 18, respectively, to supply groups of parallel signals, representative of digits for arithmetic combination. The arithmetic unit A is a floating-point, parallel system, which may be variously constructed in accordance with the present knowledge of the art, e.g. see the book entitled "Arithmetic Operations in Digital Computers" by R. K. Richards, published 1955 by D. Van Nostrand Company. For a detailed showing of a floating point arithmetic unit, see United States Patent 2,538,636 to Williams, wherein X and Y values are registered in binary decimal form in separate exponent (characteristics) and mantissa registers. The system includes structure for shifting the mantissa of one value (if necessary) to provide the characteristics equal. Structure is also provided for adding the resulting mantissa values to provide an output which also includes the established characteristic.

Parallel signals representing the characteristic values of the numbers to be combined in applicant's system are received by the arithmetic unit A through cables 20 and 22. The cable 20 is connected to the movable contacts of a gang of single-pole, double-throw switches 24 (represented by a single illustrative cable switch). One set of the stationary contacts of switches 24 are connected to the characteristic register R4 by a cable 26. The other set of stationary contacts in the switches 24 are connected to the "E" section of the register R1 through a cable 28. The cable 28 is also connected through a gang of single-pole, single-throw switches 30 (represented by a single switch) and a cable 32 to the arithmetic unit A.

The cables 16 and 32 serve to supply the signals representing the mantissa to the arithmetic unit A. The unit A may function to employ the signals from cable 16 only, or signals from both cables 16 and 32. That is the arithmetic unit A is capable of receiving and combining groups of digits which fully or partially occupy the registers R1 and R2. If these registers contain values in conventional floating-point form, then storage space is also provided for the exponent value, and the mantissa value must contain fewer digits.

The register R2 is connected to the arithmetic unit A in a manner similar to the register R1. Specifically, the cable 22 is connected through a series of switches 34 to receive signals either from the characteristic register R4 or the "E" section of the register R2. The "E" section of the register R2 is also connected through cable 36, switches 38, and cable 40 to the arithmetic unit A. It is to be noted that all the gangs of switches 24, 30, 38 and 34 may be operated by a single control, as the exemplary mechanical control button 42 shown in the figure.

The arithmetic unit A is connected to receive two-state control signals from terminals 48 and 50. The high state of a control signal at terminal 48 instructs the arithmetic unit to perform an addition and a high signal at terminal 50 commands a multiplication. Of course, the arithmetic unit A may be constructed to perform a variety of other operations; however, the "addition" and "multiplication" operations are adequate to illustrate the present invention.

The signals developed by the arithmetic unit A (representative of a numerical result) are passed through cables 52 and 54, to be registered in a shift register R3, including an "N" section for the mantissa and an "E" section for the characteristic. The shift register R3 has a greater capacity than the registers R1 and R2, and operates as a parallel-input shift register which shifts digital signals stage-by-stage to the left upon receiving pulses through a conductor 58. The shift register R3 also has a parallel output through a cable 60, which is connected to the memory M via the control unit C.

The stages of the "E" section of the shift register R3 are connected to a comparator circuit 62 through a cable 64. The comparator circuit is also connected to the stages of the exponent register R4 through a cable

66. The comparator circuit 62 provides a high value of a two-state signal in a conductor 68 upon receiving similar signals from the registers R3 and R4. The conductor 68 is connected through an inverter circuit 70 to an "and" or coincidence gate 72. The inverter circuit 70 changes the state of the received two-state signal, that is, inverts the received signal.

The "and" gate 72 is also connected to a flip-flop circuit 74 and a pulse generator 76. The "and" gate 72 passes pulses from the pulse generator 76, upon receiving qualifying high signal values from both the inverter 70 and the flip-flop circuit 74. These pulses are thus applied to the shift register R3 after an arithmetic operation is complete to shift the digit signals in the register R3 to the right. This shifting occurs until the characteristic value of the computed result coincides to the characteristic registered in the characteristic register R4.

The flip-flop circuit 74 is connected to receive a signal from the arithmetic unit A upon the completion of an arithmetic operation, which sets the output from the flip-flop circuit 74 in a high state to partially qualify the gate circuit 72. The flip-flop circuit is also connected to receive a signal through an "or" gate 78 from the terminals 48 and 50. Therefore, signals applied to these terminals to command an arithmetic operation, reset the flip-flop circuit 74 to disqualify the gate circuit until the arithmetic operation is complete. The flip-flop circuit 74 serves to manifest the completion of an operation by the arithmetic unit A, and the comparator circuit 62 (through the inverter 70) indicates that a proper number of shifts have been performed. The shifting operation serves to establish output values from the system which have the same characteristic as the input values. However, the shifting operation may be eliminated by opening a switch 75 in the conductor connecting the flip-flop circuit 74 to the gate 72.

As indicated above, the illustrative system has two possible modes of operation, i.e. conventional floating-point or variable-exponent. In the floating-point mode the ganged switches controlled by the push-button 42 are positioned to the right to connect the "E" sections of the registers R1 and R2 to the characteristic sections of the arithmetic unit A. Also, the switch 75 is opened. The values (characteristic and mantissa) to be arithmetically combined are then registered (in floating-point form) in the registers R1 and R2; and upon application of a control signal at one of the terminals 48 or 50, these values are either added or multiplied. Signals representative of the sum or product are then developed in the register R3 in accordance with the well known principles of float-point arithmetic operation and as described in the above referenced Williams patent.

To operate the system in the variable-exponent mode, switch 75 is closed and the switches 24, 30, 34 and 38 are positioned to the left, connecting all the stages of registers R1 and R2 to the mantissa portion of the arithmetic unit A, and connecting the characteristic register R4 to the characteristic input of the arithmetic unit. Next, signals representing two mantissa values are placed in the registers R1 and R2, and the common characteristic (to locate the point in both groups) is registered through cable 67 in the characteristic register R4. It is to be noted that the mantissa values in the registers may now comprise a greater number of digits than in the floating-point mode.

The occurrence of a command signal, applied to one of the terminals 48 or 50, initiates the operation of the arithmetic unit A to add or multiply the values registered in registers R1 and R2, and register the result in the register R3. This signal also resets the flip-flop circuit 74. Considering a specific example of an arithmetic combination, the following chart is used. The decimal significance of the digits is indicated as an aid to understanding:

| Decimal significance | Characteristic | | | Mantissa | | | | |
|---|---|---|---|---|---|---|---|---|
| | 1 | 2 | 4 | 16 | 8 | 4 | 2 | 1 |
| Multiplicand | 1 | 0 | 0 | 0 | 0 | 1 | 0 | 1 |
| Multiplier | 1 | 0 | 0 | 0 | 0 | 1 | 1 | 0 |
| Product (Floating Point) | 0 | 1 | 0 | 0 | 1 | 1 | 1 | 1 |
| Adjusted Product | 1 | 0 | 0 | 1 | 1 | 1 | 1 | 0 |

| Multiplicand | | Multiplier | | Product | | Adjusted Product | |
|---|---|---|---|---|---|---|---|
| Mantissa | Char. | Mantissa | Char. | Mantissa | Char. | Mantissa | Char. |
| (00101 | 100) . | (00110 | 100) = | (01111 | 010) = | (11110 | 100) |

Assume a group of signals representative of binary digits 00101 (decimal 5) is registered in the register R1 to indicate the multiplicated mantissa and digits 00110 (decimals 6) are registered in the register R2 as the multiplier mantissa. Further assume, the binary digits 100 (decimal 1) are registered in the characteristic register R4 indicating $2^1$ or 2 which in the illustrative system establishes the binary point in the two groups of digits at the right of the least-significant digit position.

Now, on occurence of a command signal at the terminal 50 (for example) the values in the registers R1 and R2 are multiplied by the arithmetic unit A and registered in the shift register R3 as the floating-point product values, 01111 and 010. This product is shown as the product in the above chart. Of course, according to the conventional operation of the arithmetic unit A, mantissa values are multiplied and with some exceptions the characteristic values are added. The logic of the arithmetic circuit functions to develop the mantissa value in the register R3, with a "one" in the least significant digit position to economize storage space. Compensating operations to correct this adjustment are reflected in the "E" section of the register R3, as well known in the prior art floating point arithmetic units.

Normally, in this mode of opeartion, it will be desired to use more stages of the register R3 to hold the mantissa value, and after the characteristic value to coincide with that contained in the characteristic register R4. This operation is illustrated in the last line of the above chart and will now be considered.

Upon the occurrence of the command signal applied to one of the terminals 48 or 50, a signal is passed through the "or" gate 78 to reset the flip-flop circuit 74 and provide a low signal through switch 75 to the "and" gate 72. As a result, pulses from the pulse generator 76 are blocked by the gate 72. At the completion of the arithmetic operation, a signal is applied from the arithmetic unit to set the flip-flop circuit 74. Therefore, a signal is applied through the switch 75 which signal qualifies the gate 72 allowing pulses from the pulse source 76 to pass through the gate 72 and shift the signals in the register R3 to the left until the selected value of the characteristic is reached (one shift to produce 100 and 11110). This occurrence is detected by the comparator circuit 62, which supplies a high value of a two-state signal to the inverter 70, which in turn provides a low signal to inhibit the gate 72, preventing further digit shifting.

As a result of the above-described operation, the signals representing the result of an arithmetic operation are established in the register R3, with the selected characteristic value. This result value is indicated in the above chart as the shifted product.

It may therefore be seen that the present invention provides an improved computer system wherein variable-exponent operation may be combined with conventional floating point operation afford flexibility of operation and improve utilization of the memory system.

It should be noted that although the particular embodiment of the invention herein shown and described is fully capable of providing the advantages and achieving the objects set forth, such embodiment is merely illustrative and this invention is not to be limited to the details of construction illustrated and described herein, except as defined in the appended claims.

What is claimed is:

1. A computer wherein values are represented by first signals indicative of a mantissa value and associated second signals indicative of a characteristic value to establish the point in the mantissa value, comprising: register means for registering a plurality of groups of first signals and associated groups of second signals; arithmetic means for combining selected groups of first signals and associated second signals from said register means to produce signals representative of a mantissa value and a characteristic value jointly indicative of an arithmetic combination of the values represented by said selected groups; means for changing the operation of said register means and said arithmetic means to an altered mode wherein said first and said second signals represent a mantissa value; and a characteristic register, connected to said arithmetic means for registering second signals indicative of a characteristic value common to mantissa values received by said arithmetic means during operation in said altered mode.

2. Apparatus according to claim 1 including a shift register in which said signals indicative of an arithmetic combination are registered, and means for shifting the signal registered in said shift register to cause the second signals therein to coincide to the second signals registered in said characteristic register.

3. In a computer wherein numerical values are indicated by representations including first and second groups of digital signals, said first signals representing a mantissa value and said second signals representing a characteristic value, said computer including register means for registering said representations, and arithmetic means for arithmetically combining said representations to form other similar representations indicative of the result of an arithmetic combination, the improvement which comprises: control means for altering the mode of applying said representations from said register means to said arithmetic means to an alternate mode wherein both said first and said second groups of signals represent a mantissa value, and characteristic register means for registering a second group of signals common to various mantissa-value representations applied to said arithmetic means during said alternate mode.

4. Apparatus according to claim 3 wherein said arithmetic unit includes a register in which signals representing arithmetic combinations are developed and further includes means for shifting the contents of said register until the second signals registered therein are similar to the second signals registered in said characteristic register means.

5. A computer wherein values are represented by first signals indicative of a mantissa value and associated second signals indicative of a characteristic value to establish the point in the mantissa value, comprising: register means for registering a plurality of groups of first signals representing mantissa values; a characteristic register for registering various second signals representing a characteristic value common to said mantissa values; and an arithmetic unit connected to receive and combine selected groups of said first signals designated to have a characteristic value indicated by the contents of said characteristic register.

6. A computer wherein values are represented by first signals indicative of a mantissa value and associated second signals indicative of a characteristic value to establish the point in the mantissa value, comprising: register means for registering a plurality of groups of first signals representing groups of mantissa values; a characteristic register for registering various second signals representing a single characteristic value common to each of said mantissa values; an arithmetic unit connected to receive and combine selected groups of said first signals to form third signals representative of the combination; and means for altering said third signals whereby the characteristic indicated coincides to the characteristic registered in said exponent register.

7. Apparatus according to claim 6 wherein said means for altering said third signals comprises a shift register adopted to receive said third signals and means for commanding operation of said shift register until the occurrence of coincidence.

8. Apparatus according to claim 6 further including means for rendering said exponent register inoperative to control said arithmetic unit and means for connecting a portion of said register means to said arithmetic unit to supply said second signals.

References Cited in the file of this patent

UNITED STATES PATENTS 2,538,636 Williams ---------------- Jan. 16, 1951